(12) United States Patent
Zhou

(10) Patent No.: US 8,947,019 B2
(45) Date of Patent: Feb. 3, 2015

(54) HANDHELD DEVICE AND POWER SUPPLY CIRCUIT THEREOF

(71) Applicants: Hong Fu Jin Precision Industry (ShenZhen) Co., Ltd., Shenzhen (CN); Hon Hai Precision Industry Co., Ltd., New Taipei (TW)

(72) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/162,761

(22) Filed: Jan. 24, 2014

(65) Prior Publication Data

US 2014/0217890 A1  Aug. 7, 2014

(30) Foreign Application Priority Data

Feb. 4, 2013  (CN) .......................... 2013 1 00421538

(51) Int. Cl.
H05B 37/02  (2006.01)
H05B 33/08  (2006.01)
(52) U.S. Cl.
CPC .................................. *H05B 33/0815* (2013.01)
USPC ............. 315/307; 315/291; 315/86; 315/216; 345/102; 345/204; 345/95; 345/690

(58) Field of Classification Search
CPC ............... H05B 41/2853; H05B 37/02; H05B 33/0815; H05B 33/0818; H05B 33/0827; G09G 2330/021; G09G 3/3406; G09G 3/22; G06F 1/3203; G06F 1/3265
USPC ................ 315/86, 169.1, 216, 291, 307, 360; 345/102, 204, 87, 92, 95, 690, 691
See application file for complete search history.

(56) References Cited

U.S. PATENT DOCUMENTS

| | | | |
|---|---|---|---|
| 6,459,175 B1 * | 10/2002 | Potega | 307/149 |
| 7,361,879 B2 * | 4/2008 | Lomba et al. | 250/208.1 |
| 8,031,164 B2 * | 10/2011 | Herz et al. | 345/102 |
| 8,654,068 B2 * | 2/2014 | Aitken | 345/102 |

* cited by examiner

*Primary Examiner* — Haiss Philogene
(74) *Attorney, Agent, or Firm* — Novak Druce Connolly Bove + Quigg LLP

(57) ABSTRACT

A handheld device includes a backlight driving unit and a power supply circuit for powering the backlight driving unit. The power supply circuit includes a power management unit, a battery, a first electronic switch, a second electronic switch, and a control unit. When a voltage of a second terminal of the second electronic switch is less than a reference voltage of the control unit, the control unit turns on the first electronic switch and turns off the second electronic switch. The backlight driving unit is powered by the battery through the first electronic switch. When the voltage of the second terminal of the second electronic switch is more than the reference voltage of the control unit, the control unit turns off the first electronic switch and turns on the second electronic switch. The backlight driving unit is powered by the PMU through the second electronic switch.

10 Claims, 1 Drawing Sheet

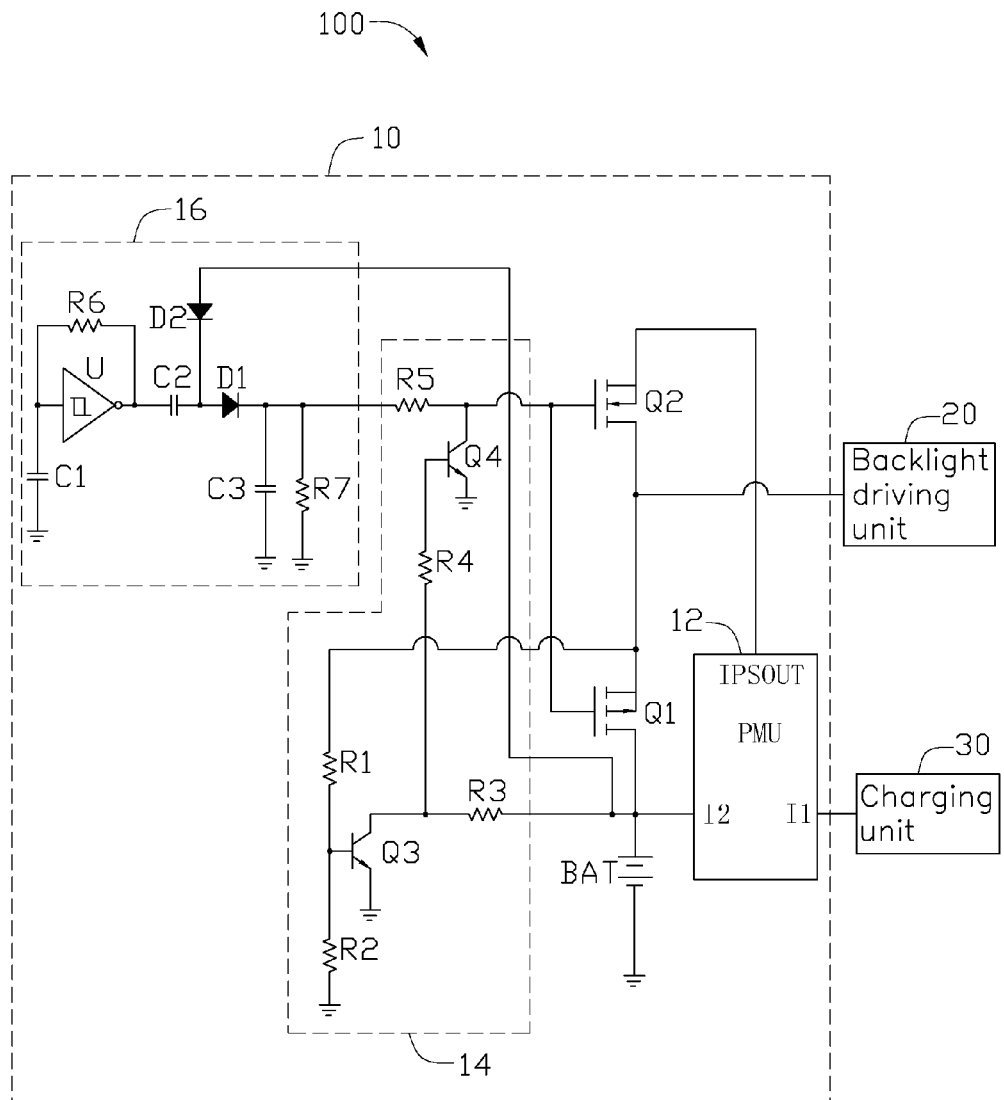

HANDHELD DEVICE AND POWER SUPPLY CIRCUIT THEREOF

BACKGROUND

1. Technical Field

The present disclosure relates to handheld devices, and particularly to a handheld device with a power supply circuit.

2. Description of Related Art

Most handheld devices, such as mobile phones, are powered by power management units (PMUs), which can meet power demand of a handheld device after the handheld device is booted up. However, if the PMU is the power supply for the handheld device, when the handheld device is being booted-up, the PMU may fail to power up the handheld device because a backlight driving unit of the handheld device takes a high current when the handheld device is booted-up. If the high current taken is over the maximum current of the PMU, the PMU enters an under-voltage protection mode. Therefore, a PMU with a greater maximum current can be employed, but the greater the maximum current, the more expensive the PMU.

BRIEF DESCRIPTION OF THE DRAWING

Many aspects of the present disclosure can be better understood with reference to the following drawing. The components in the drawing are not necessarily drawn to scale, the emphasis instead being placed upon clearly illustrating the principles of the present embodiments.

The FIGURE is a circuit diagram of a handheld device in accordance with an embodiment of the present disclosure.

DETAILED DESCRIPTION

The disclosure, including the accompanying drawing, is illustrated by way of example and not by way of limitation. It should be noted that references to "an" or "one" embodiment in this disclosure are not necessarily to the same embodiment, and such references can mean "at least one."

The figure shows an embodiment of a handheld device 100. The handheld device 100 comprises a power supply circuit 10, a backlight driving unit 20, and a charging unit 30 which is connected to commercial power supply (not shown). The backlight driving unit 20 is powered by the power supply circuit 10. The power supply circuit 10 is powered by the charging unit 30. The backlight driving unit 20 drives a display (not shown) of the handheld device 100. In one embodiment, the handheld device 100 may be a mobile phone or a personal digital assistant, the power supply circuit 10 may also power other elements of the handheld device 100, to enable the handheld device 100 to operate normally.

The power supply circuit 10 comprises a power management unit (PMU) 12, a first electronic switch Q1, a second electronic switch Q2, a control unit 14, a voltage multiplying unit 16, and a rechargeable battery BAT. The PMU 12 comprises a first input pin I1, a second input pin I2, and an output pin IPOUT. The first input pin I1 is electrically connected to the charging unit 30. The second input pin I2 is electrically connected to a positive terminal of the rechargeable battery BAT. A negative terminal of the rechargeable battery BAT is grounded. Each of the first electronic switch Q1 and the second electronic switch Q2 comprises a first terminal, a second terminal, and a third terminal The first terminal of the first electronic switch Q1 is electrically connected to the control unit 14. The second terminal of the first electronic switch Q1 is electrically connected to the positive terminal of the rechargeable battery BAT. The third terminal of the first electronic switch Q1 is electrically connected to the backlight driving unit 20. The first terminal of the second electronic switch Q2 is electrically connected to the first terminal of the first electronic switch Q1. The second terminal of the second electronic switch Q2 is electrically connected to the backlight driving unit 20. The third terminal of the second electronic switch Q2 is electrically connected to the output pin IPOUT of the PMU 12. The control unit 14 is electrically connected to the second terminal of the second electronic switch Q2 and the positive terminal of the rechargeable battery BAT. The voltage multiplying unit 16 is electrically connected to the control unit 14 and the positive terminal of the rechargeable battery BAT. The voltage multiplying unit 16 multiplies voltage of the rechargeable battery BAT into a first voltage, and outputs the first voltage to the control unit. The control unit 14 turns on and turns off the first electronic switch Q1 and the second electronic switch Q2 according to voltage of the second terminal of the second electronic switch Q2.

The control unit 14 comprises a third electronic switch Q3, a fourth electronic switch Q4, and five resistors R1-R5. Each of the third electronic switch Q3 and the fourth electronic switch Q4 comprises a first terminal, a second terminal, and a third terminal The first terminal of the third electronic switch Q3 is electrically connected to the second terminal of the second electronic switch Q2 through the resistor R1, and grounded through the resistor R2. The second terminal of the third electronic switch Q3 is electrically connected to the positive terminal of the rechargeable battery BAT through the resistor R3. The third terminal of the third electronic switch Q3 is grounded. The first terminal of the fourth electronic switch Q4 is electrically connected to the second terminal of the third electronic switch Q3 through the resistor R4. The second terminal of the fourth electronic switch Q4 is electrically connected to the voltage multiplying unit 16 through the resistor R5, to receive the first voltage. The third terminal of the fourth electronic switch Q4 is grounded. In one embodiment, a turn-on voltage of the electronic switch Q3 functions as a reference voltage of the control unit 14.

The voltage multiplying unit 16 comprises a Schmitt trigger U, a first diode D1, a second diode D2, three capacitors C1-C3, and two resistors R6 and R7. The Schmitt trigger U comprises an input terminal and an output terminal Each of the first diode D1 and the second diode D2 comprises an anode and a cathode. The input terminal of the Schmitt trigger U is grounded through the capacitor C1. The output terminal of the Schmitt trigger U is electrically connected to the input terminal of the Schmitt trigger U through the resistor R6, and is electrically connected to the anode of the first diode D1 and the cathode of the second diode D2 through the capacitor C2. The cathode of the first diode D1 is grounded through the capacitor C3 and grounded through the resistor R7. The anode of the second diode D2 is electrically connected to the positive terminal of rechargeable battery BAT. A node between the cathode of the first diode D1 and the resistor R7 functioning as the output terminal of the voltage multiplying unit 16, is electrically connected to the control unit 14 to output the first voltage to the control unit 14.

The operating principle of the voltage multiplying unit 16 will be described as follows.

When the handheld device 100 is not turned on, the Schmitt trigger U is not powered on, the output terminal of the Schmitt trigger U maintains a low level, such as logic 0, and the second diode D2 is turned on. A voltage difference between two ends of the capacitor C2 is approximately equal to the voltage of rechargeable battery BAT minus a voltage of the second diode D2. When the handheld device 100 is turned on, the Schmitt trigger U is powered on and operates. The input terminal of the Schmitt trigger U receives a low level signal, such as logic 0, and the output terminal of the Schmitt trigger U outputs a high level signal, such as logic 1. A voltage of the anode of the first diode D1 is pulled up and the capacitor C3 is charged, because the voltage difference between two ends of the capacitor C2 is maintained to be the same by the capacitor C2. When the output terminal of the Schmitt trigger U outputs the high level signal, the capacitor C1 is charged by the output terminal of the Schmitt trigger U through the resistor R6. Therefore, a voltage at the input terminal of the Schmitt trigger U increases. When the voltage of the input terminal of the Schmitt trigger U is equal to or more than a positive threshold voltage of the Schmitt trigger U, the output terminal of the Schmitt trigger U outputs a low level signal. The voltage of the anode of the first diode D1 is pulled down, and the capacitor C3 is discharged. When the output terminal of the Schmitt trigger U outputs the low level signal, the capacitor C1 is discharged, and the voltage at the input terminal of the Schmitt trigger U decreases. When the voltage of the input terminal of the Schmitt trigger U is equal to or less than a negative threshold voltage of the Schmitt trigger U, the output terminal of the Schmitt trigger U outputs the high level signal. The voltage of the anode of the first diode D1 is pulled up, and the capacitor C3 is charged. The output terminal of the voltage multiplying unit 16 can then output the first voltage. The first voltage is used for turning on the second electronic switch Q2 when the fourth electronic switch Q4 is turned off.

When the first input pin I1 of the PMU 12 is not connected to the charging unit 30, the PMU 12 supplies power taken from the rechargeable battery BAT, to the handheld device 100. When the first input pin I1 of the PMU 12 is electrically connected to the charging unit 30, the PMU 12 supplies power taken from the charging unit 30 to the handheld device 100 and to the rechargeable battery BAT by way of recharging the rechargeable battery BAT.

When the handheld device 100 is booted-up, the output pin IPOUT of the PMU 12 supplies power to the backlight driving unit 20 through the second electronic switch Q2. When the backlight driving unit 20 is being powered on, a spike current will be drawn by the backlight driving unit 20 and flow from the PMU 12 through the second electronic switch Q2. When the spike current does not reach its peak and is less than the maximum current of the PMU 12, the PMU 12 does not enter into an under-voltage protection mode.

The PMU 12 has a small resistance, and the voltage of the rechargeable battery BAT is divided by the PMU 12 and the backlight driving unit 20 connected in series. When the spike current is small, a voltage of the PMU 12 is negligible, and the voltage of the backlight driving unit 20 is approximately equal to the voltage of the rechargeable battery BAT. When the spike current is high, the voltage of the PMU 12 will be greater, and the voltage of the backlight driving unit 20 will be less. In this state, a voltage of the second terminal of the second electronic switch Q2 is less than the reference voltage of the control unit 14, a voltage received by the first terminal of the third electronic switch Q3 is less than the turn-on voltage of the electronic switch Q3, the third electronic switch Q3 is turned off, and the fourth electronic switch Q4 is turned on. The second terminal of the fourth electronic switch Q4 outputs a low level signal, such as logic 0, to the first terminals of the first electronic switch Q1 and the second electronic switch Q2. The first electronic switch Q1 is turned on, the second electronic switch Q2 is turned off, and the rechargeable battery BAT is then supplying power to the backlight driving unit 20 through the first electronic switch Q1.

When the backlight driving unit 20 is powered by the rechargeable battery BAT through the first electronic switch Q1, the voltage of the backlight driving unit 20 is approximately equal to the voltage of the rechargeable battery BAT, which is more than the reference voltage of the control unit 14. The voltage received by the first terminal of the third electronic switch Q3 is more than the turn-on voltage of the electronic switch Q3, the third electronic switch Q3 is turned on, and the fourth electronic switch Q4 is turned off. The output terminal of the voltage multiplying unit 16 outputs the first voltage to the first terminals of the first electronic switch Q1 and the second electronic switch Q2 through the resistor R5. The first electronic switch Q1 is turned off, the second electronic switch Q2 is turned on. The output pin IPOUT of the PMU 12 supplies power to the backlight driving unit 20 through the second electronic switch Q2. Because the spike current is only transitory, when the second electronic switch Q2 goes to a turned on state from a turned off state, the spike current goes away. The second electronic switch Q2 is then maintained in the turned on state, and the output pin IPOUT of the PMU 12 supplies power to the backlight driving unit 20 through the second electronic switch Q2.

In one embodiment, the first electronic switch Q1 is a p-channel metal-oxide semiconductor field-effect transistor (PMOSFET), and the first terminal, the second terminal, and the third terminal of the first electronic switch Q1 are respectively corresponding to a gate, a drain, and a source of the PMOSFET. The second electronic switch Q2 is an n-channel metal-oxide semiconductor field-effect transistor (NMOSFET), and the first terminal, the second terminal, and the third terminal of the second electronic switch Q2 are respectively corresponding to a gate, a drain, and a source of the NMOSFET. Each of the third electronic switch Q3 and the fourth electronic switch Q4 is an npn-type bipolar junction transistor (BJT), and the first terminal, the second terminal, and the third terminal of each of the third electronic switch Q3 and the fourth electronic switch Q4 respectively corresponding to a base, a collector, and an emitter of the npn-type BJT. In other embodiments, the first electronic switch Q1 may be a pnp-type bipolar junction transistor, or other switch having similar functions. The second electronic switch Q2 may be an npn-type bipolar junction transistor, or other switch having similar functions. Each of the third electronic switch Q3 and the fourth electronic switch Q4 may be an NMOSFET, or other switch having similar functions.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A power supply circuit for powering a backlight driving unit of a handheld device, the power supply circuit comprising:
   a power management unit (PMU) comprising an input pin and an output pin;
   a rechargeable battery comprising a positive terminal electrically connected to the input pin of the PMU, and a negative terminal grounded;
   a first electronic switch comprising a first terminal, a second terminal electrically connected to the positive terminal of the rechargeable battery, and a third terminal electrically connected to the backlight driving unit; and a second electronic switch comprising a first terminal, a second terminal electrically connected to the backlight driving unit, and a third terminal electrically connected to the output pin of the PMU;

a control unit electrically connected to the first terminals of the first electronic switch and the second electronic switch, the second terminal of the second electronic switch, and the positive terminal of the rechargeable battery;

wherein in response to a voltage of the second terminal of the second electronic switch being less than a reference voltage of the control unit, the control unit outputs a first control signal to the first terminals of the first electronic switch and the second electronic switch, such that the first electronic switch is turned on and the second electronic switch is turned off, the backlight driving unit is then powered by the rechargeable battery through the first electronic switch; and wherein in response to the voltage of the second terminal of the second electronic switch being more than the reference voltage of the control unit, the control unit outputs a second control signal to the first terminals of the first electronic switch and the second electronic switch, such that the first electronic switch is turned off and the second electronic switch is turned on, the backlight driving unit is then powered by the output pin of the PMU through the second electronic switch.

2. The power supply circuit of claim 1, further comprising a voltage multiplying unit electrically connected to the control unit and the positive terminal of the rechargeable battery, wherein the voltage multiplying unit multiplies a voltage of the rechargeable battery into a first voltage and outputs the first voltage to the control unit, the voltage multiplying unit comprises:

a first resistor and a second resistor;

a first capacitor, a second capacitor, and a third capacitor;

a Schmitt trigger comprising an input terminal grounded through the first capacitor, and an output terminal electrically connected to the input terminal of the Schmitt trigger through the first resistor;

a first diode comprising an anode electrically connected to the output terminal of the Schmitt trigger through the second capacitor, and a cathode electrically connected to the control unit, the cathode of the first diode further grounded through the third capacitor and grounded through the second resistor; and a second diode comprising an anode electrically connected to the positive terminal of the rechargeable battery, and a cathode electrically connected to the anode of the first diode.

3. The power supply circuit of claim 2, wherein the control unit comprises:

a third resistor, a fourth resistor, a fifth resistor, a sixth resistor, and a seventh resistor;

a third electronic switch comprising a first terminal electrically connected to the second terminal of the second electronic switch through the third resistor and grounded through the fourth resistor, a second terminal electrically connected to the positive terminal of the rechargeable battery through the fifth resistor, and a third terminal grounded; and a fourth electronic switch comprising a first terminal electrically connected to the second terminal of the third electronic switch through the sixth resistor, a second terminal electrically connected to the voltage multiplying unit through the seventh resistor to receiving the first voltage and electrically connected to the first terminals of the first electronic switch and the second electronic switch, and a third terminal grounded;

wherein a turn-on voltage of the third electronic switch functions as the reference voltage of the control unit;

wherein in response to the voltage of the second terminal of the second electronic switch being less than the reference voltage of the control unit, the third electronic switch is turned off, the fourth electronic switch is turned on, the second terminal of the fourth electronic switch outputs the first control signal to the first terminals of the first electronic switch and the second electronic switch; and wherein in response to the voltage of the second terminal of the second electronic switch being more than the reference voltage of the control unit, the third electronic switch is turned on, the fourth electronic switch is turned off, the second terminal of the fourth electronic switch outputs the second control signal to the first terminals of the first electronic switch and the second electronic switch.

4. The power supply circuit of claim 3, wherein each of the third electronic switch and the fourth electronic switch is an npn-type bipolar junction transistor (BJT), and the first terminal, the second terminal, and the third terminal of each of the third electronic switch and the fourth electronic switch respectively correspond to a base, a collector, and an emitter of the npn-type BJT.

5. The power supply circuit of claim 1, wherein the first electronic switch is a p-channel metal-oxide semiconductor field-effect transistor (PMOSFET), and the first terminal, the second terminal, and the third terminal of the first electronic switch are respectively correspond to a gate, a drain, and a source of the PMOSFET; the second electronic switch is an n-channel metal-oxide semiconductor field-effect transistor (NMOSFET), and the first terminal, the second terminal, and the third terminal of the second electronic switch are respectively correspond to a gate, a drain, and a source of the NMOSFET.

6. A handheld device comprising:

a backlight driving unit; and a power supply circuit for powering the backlight driving unit, the power supply circuit comprising:

a power management unit (PMU) comprising an input pin and an output pin;

a rechargeable battery comprising a positive terminal electrically connected to the input pin of the PMU, and a negative terminal grounded;

a first electronic switch comprising a first terminal, a second terminal electrically connected to the positive terminal of the rechargeable battery, and an output terminal electrically connected to the backlight driving unit; and a second electronic switch comprising a first terminal, a second terminal electrically connected to the backlight driving unit, and a third terminal electrically connected to the output pin of the PMU;

a control unit electrically connected to the first terminals of the first electronic switch and the second electronic switch, the second terminal of the second electronic switch, and the positive terminal of the rechargeable battery; and wherein in response to a voltage of the second terminal of the second electronic switch being less than a reference voltage of the control unit, the control unit outputs a first control signal to the first terminals of the first electronic switch and the second electronic switch, such that the first electronic switch is turned on and the second electronic switch is turned off, the backlight driving unit is then powered by the rechargeable battery through the first electronic switch; and wherein in response to the voltage of the second terminal of the second electronic switch being more than the reference voltage of the control unit, the control unit outputs a second control signal to the first terminals of the first electronic switch and the second electronic switch, such that the first electronic switch is turned off and the second electronic switch is turned on, the backlight driving unit is then powered by the output pin of the PMU through the second electronic switch.

7. The handheld device of claim 6, wherein the power supply circuit further comprises a voltage multiplying unit electrically connected to the control unit and the positive terminal of the rechargeable battery, the voltage multiplying unit multiplies a voltage of the rechargeable battery into a first voltage and outputs the first voltage to the control unit, and the voltage multiplying unit comprises:
 a first resistor and a second resistor;
 a first capacitor, a second capacitor, and a third capacitor;
 a Schmitt trigger comprising an input terminal grounded through the first capacitor, and an output terminal electrically connected to the input terminal of the Schmitt trigger through the first resistor;
 a first diode comprising an anode electrically connected to the output terminal of the Schmitt trigger through the second capacitor, and a cathode electrically connected to the control unit, the cathode of the first diode further grounded through the third capacitor and grounded through the second resistor; and
 a second diode comprising an anode electrically connected to the positive terminal of the rechargeable battery, and a cathode electrically connected to the anode of the first diode.

8. The handheld device of claim 7, wherein the control unit comprises:
 a third resistor, a fourth resistor, a fifth resistor, a sixth resistor, and a seventh resistor;
 a third electronic switch comprising a first terminal electrically connected to the second terminal of the second electronic switch through the third resistor and grounded through the fourth resistor, a second terminal electrically connected to the positive terminal of the rechargeable battery through the fifth resistor, and a third terminal grounded; and
 a fourth electronic switch comprising a first terminal electrically connected to the second terminal of the third electronic switch through the sixth resistor, a second terminal electrically connected to the voltage multiplying unit through the seventh resistor to receiving the first voltage and electrically connected to the first terminals of the first electronic switch and the second electronic switch, and a third terminal grounded;

wherein a turn-on voltage of the third electronic switch functions as the reference voltage of the control unit;

wherein in response to the voltage of the second terminal of the second electronic switch being less than the reference voltage of the control unit, the third electronic switch is turned off, the fourth electronic switch is turned on, the second terminal of the fourth electronic switch outputs the first control signal to the first terminals of the first electronic switch and the second electronic switch; and wherein in response to the voltage of the second terminal of the second electronic switch being more than the reference voltage of the control unit, the third electronic switch is turned on, the fourth electronic switch is turned off, the second terminal of the fourth electronic switch outputs the second control signal to the first terminals of the first electronic switch and the second electronic switch.

9. The handheld device of claim 8, wherein each of the third electronic switch and the fourth electronic switch is an npn-type bipolar junction transistor (BJT), and the first terminal, the second terminal, and the third terminal of each of the third electronic switch and the fourth electronic switch respectively correspond to a base, a collector, and an emitter of the npn-type BJT.

10. The handheld device of claim 6, wherein the first electronic switch is a p-channel metal-oxide semiconductor field-effect transistor (PMOSFET), and the first terminal, the second terminal, and the third terminal of the first electronic switch are respectively correspond to a gate, a drain, and a source of the PMOSFET; the second electronic switch is an n-channel metal-oxide semiconductor field-effect transistor (NMOSFET), and the first terminal, the second terminal, and the third terminal of the second electronic switch are respectively correspond to a gate, a drain, and a source of the NMOSFET.

* * * * *